United States Patent [19]
Enderle

[11] Patent Number: 5,876,154
[45] Date of Patent: Mar. 2, 1999

[54] CUTTING INSERT FOR CHIP FORMING MACHINING OF WORK PIECES

[75] Inventor: Klaus Enderle, Freiberg, Germany

[73] Assignee: Komet Praezisionswerkzeuge Robert Bruening GmbH, Besigheim, Germany

[21] Appl. No.: 849,560

[22] PCT Filed: Oct. 21, 1995

[86] PCT No.: PCT/EP95/04130

§ 371 Date: May 15, 1997

§ 102(e) Date: May 15, 1997

[87] PCT Pub. No.: WO96/15869

PCT Pub. Date: May 30, 1996

[30] Foreign Application Priority Data

Nov. 19, 1994 [DE] Germany .......................... 44 41 215.0

[51] Int. Cl.$^6$ .................................................. B23B 27/22
[52] U.S. Cl. .......................... 407/114; 407/115; 407/116; 407/113
[58] Field of Search .................... 407/116, 114, 407/115, 113, 100

[56] References Cited

U.S. PATENT DOCUMENTS

| | | | |
|---|---|---|---|
| 4,988,242 | 1/1991 | Pattersson et al. | 407/114 |
| 5,044,840 | 9/1991 | Fouquer et al. | |
| 5,709,509 | 1/1998 | Wegener et al. | 407/116 X |
| 5,743,681 | 4/1998 | Wiman et al. | 407/116 X |

FOREIGN PATENT DOCUMENTS

| | | |
|---|---|---|
| 2840610 | 3/1979 | Germany ............................... 407/114 |
| 2845211 | 4/1979 | Germany . |
| 3044791A1 | 8/1981 | Germany . |
| 4309897A1 | 8/1994 | Germany . |
| WO92/14571 | 9/1992 | WIPO . |

*Primary Examiner*—Andrea L. Pitts
*Assistant Examiner*—Henry W.H. Tsai
*Attorney, Agent, or Firm*—Flynn, Thiel, Boutell & Tanis, P.C.

[57] ABSTRACT

A cutting insert for machining workpieces (preferably of metal) while removing the cuttings including at least one cutting edge (10) in the transition region between a rake (16) and a flank (18); the rake (16) comprises a flat face section (20) which is substantially parallel to the cutting edge (10) and several dome-shaped recesses aligned in a row and separated by gaps, the recesses being parallel to the cutting edge (10), and moulded into the face section (20) and partially penetrating the cutting edge (10). To ensure the uninterrupted removal of cuttings when short cuttings are produced, the invention proposes that a cutting form step (24) is provided on the face of the recesses opposite to the cutting edge (10). The cutting form step rises above the face section and is bounded by a bottom boundary line (26) on the cutting edge side and by a top boundary line (28) on the side away from the cutting edge.

17 Claims, 4 Drawing Sheets

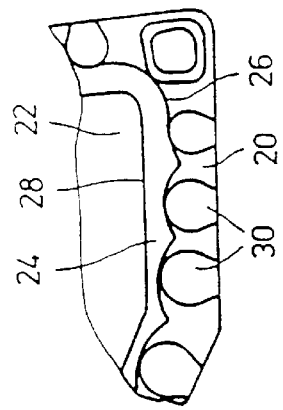
Fig. 2c
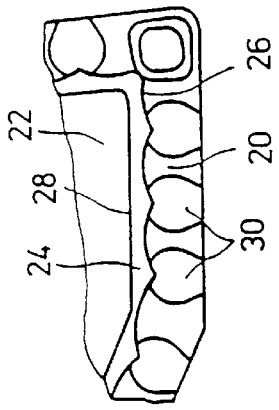
Fig. 2f
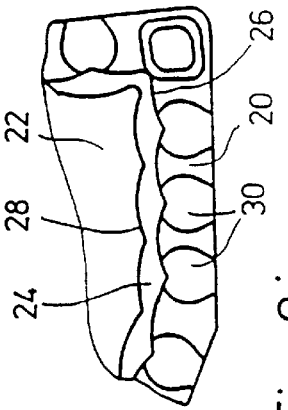
Fig. 2i
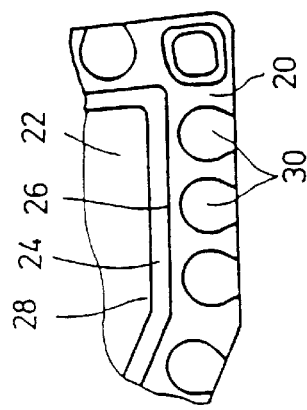
Fig. 2b
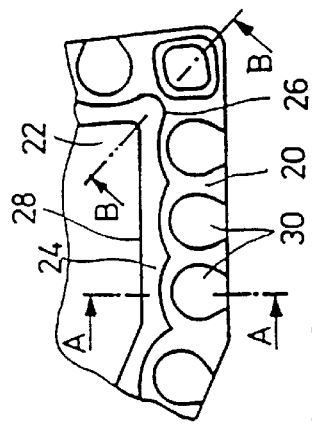
Fig. 2e
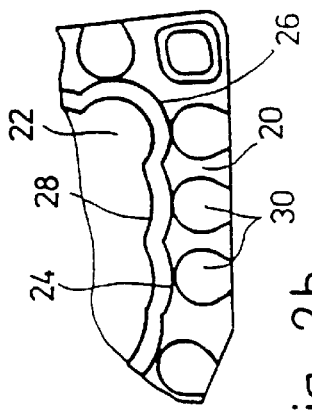
Fig. 2h
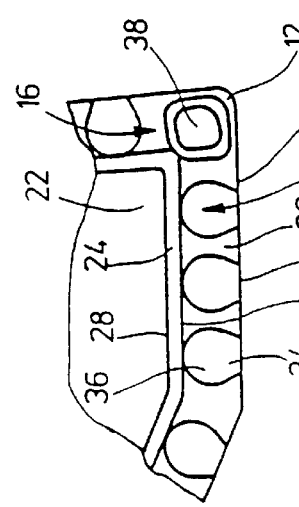
Fig. 2a
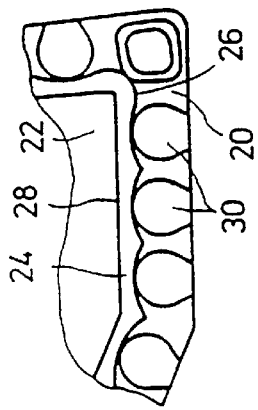
Fig. 2d
Fig. 2g

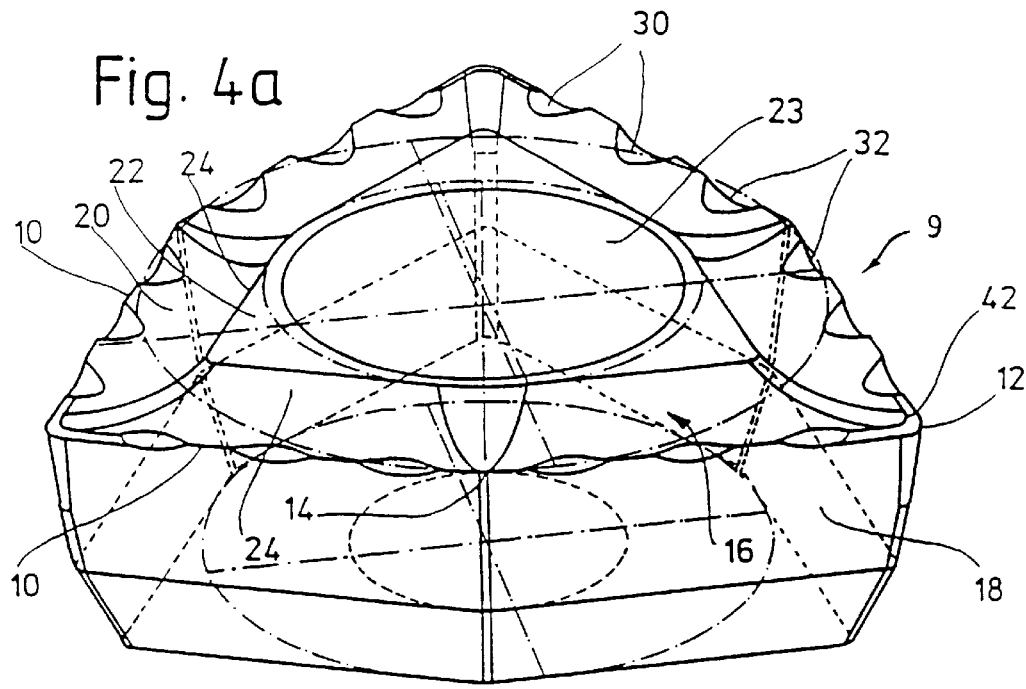
Fig. 4a
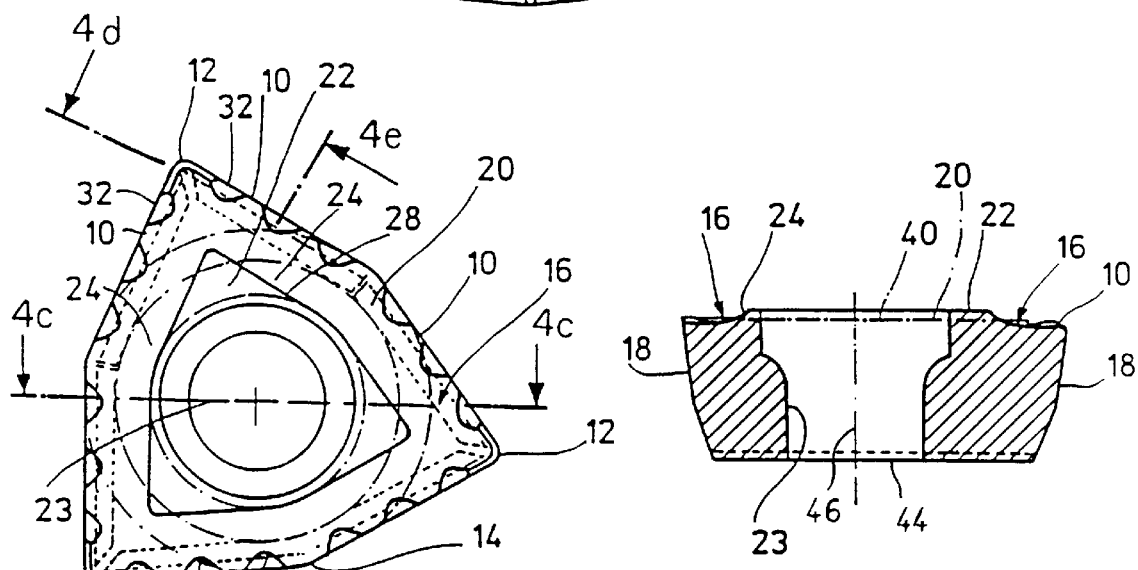
Fig. 4b
Fig. 4c
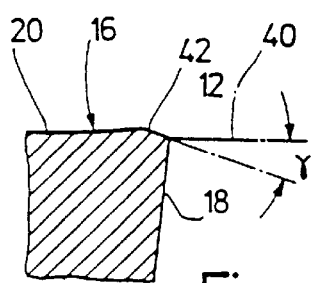
Fig. 4d
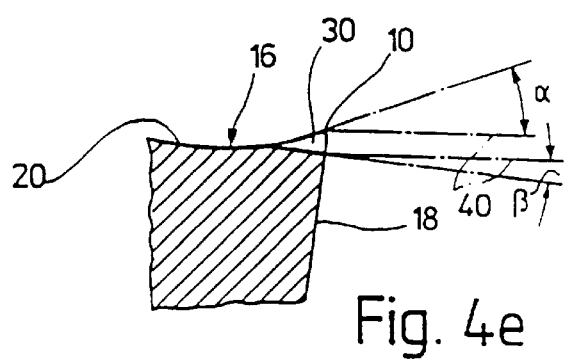
Fig. 4e

CUTTING INSERT FOR CHIP FORMING MACHINING OF WORK PIECES

FIELD OF THE INVENTION

The present invention relates to a cutting insert for chip forming machining of metallic work pieces, having at least one cutting edge limited by a rake face and a clearance face, the rake face being provided with a rake face section adjoining the cutting edge which has a positive rake angle relative to the cutting insert plane, and with a plurality of dome-shaped recesses which are arranged parallel to the cutting edge at a distance from each other, moulded into the rake face section, limited by their upper edge with respect to the rake face section and partially penetrating the cutting edge.

BACKGROUND OF THE INVENTION

It is known that chip breaking and chip removal during cutting can be facilitated by the provision of recesses in the rake face (DE-C-28 40 610). The chip obtains there during the cutting operation a wave-like structure and thereby a greater stiffness which is necessary for easy breaking. Especially for drilling, small, short broken chips are important for undisturbed stress relief. For this purpose suitable deformation of the stiffened chip, which leads to reliable chip breaking, is additionally required.

Starting with this, the present invention has the object to improve the known cutting insert of the kind. described above in such a way that during machining the formation of small, short broken chips is facilitated.

SUMMARY OF THE INVENTION

In order to attain this object, a cutting insert is provided having at least one cutting edge limited by a rake face and a clearance face, wherein the rake face has a rake face section adjoining the cutting edge which has a positive rake angle relative to the cutting insert plane and a plurality of dome-shaped recesses which are arranged parallel to the cutting edge at a distance from each other, moulded into the rake face section, limited by their upper edge with respect to the rake face section and partially penetrating the cutting edge, wherein there is provided a chip forming step on the side of the recesses opposite the cutting edge which projects beyond the rake face section, which step is limited by a lower limiting line on the side of the cutting edge and an upper limiting line away from the cutting edge, and wherein the rake face in the region of the dome-shaped recesses has a neutral or negative rake angle with respect to the cutting insert plane, characterized in that the recesses are formed as conical, cylindrical, ellipsoid or parabolic domes penetrating the cutting edge with their lowest surface line being substantially perpendicular to the clearance face.

The present invention is mainly based on the consideration to subject the chip, which was provided with a wave structure during machining, to a suitable deformation in a most confined space, by which it is broken into small pieces. In order to achieve this, the present invention provides for a chip forming step on the side of the dome-shaped recesses which is opposite the cutting edge, which step projects beyond the rake face section containing the recesses in the direction of chip breaking, and for the rake face being provided in the region of the rake face section with a positive rake angle and in the region of the recesses with a neutral or negative rake angle with respect to the cutting insert plane. An especially advantageous cutting and chip breaking behaviour is achieved when the rake angle of the concave rake face section is 15° to 25°, while in the region of the recesses, at the cutting edge, it is 0° to −10°.

During machining, the chip, which was provided with a transverse wave structure, is pushed in the chip travel direction against the chip forming step and is sharply deflected . The deflection leads to chip breaking, so that small, short broken chips are created. The chip breaking step can run at its limiting line at the side of the cutting edge tangentially into the rake face section, while, at the side of the limiting line away from the cutting edge, it can change sharp-edged into a central rake face plateau which is positioned above the cutting edge with respect to the cutting edge plane.

In a preferred embodiment the invention provides for the chip forming step to run linearly or wave-shaped, substantially parallel to the cutting edge and either touching the dome-shaped recesses with its limiting line at the side of the cutting edge, or being arranged at a distance therefrom.

If the chip forming step is curved at its limiting line at the side of the cutting edge in a wave- or zig-zag-shape, so that it does not extend into the dome-shaped recesses, additional wedge effects are created in the region between the recesses, which stimulate the chip breaking. In this respect a further improvement can be achieved in that the chip forming step with its limiting line at side of the cutting edge extends with the wedge tip which points to the cutting edge, wedge-shaped into the dome-shaped recesses and forms there their upper edge. In both cases the chip forming step may run wave-shaped and/or zig-zag-shaped with its limiting line away from the cutting edge substantially in phase or in antiphase parallel to the limiting line at the side of the cutting edge.

A further advantageous embodiment of the invention provides that the dome-shaped recesses form a conical dome-shaped concave surface which converges towards the cutting edge and penetrates the cutting edge, while they change into a spherical dome-shaped concave surface towards the side of the chip forming step. With this arrangement there is obtained an extended distance with greater rake angle extending from the cutting edge in the chip travel direction, which results in improved heat dissipation by the chips and thereby in lesser heating of the tool.

A further preferred embodiment of the invention provides that the rake face section between the cutting edge and the chip forming step is bent concavely in the chip travel direction, wherein the chip forming step touches the concavely bent rake face section tangentially and may also be bent concavely.

The recesses penetrating the cutting edge achieve that the corrugated-sheet-shaped chip only impacts at one point on the chip forming step, so that only a very low cutting resistance and a low heat transfer from the chip to the cutting insert take place. It was found to be of special advantage, when the recesses are formed as cylindrical domes penetrating the cutting edge with their cylinder axis being substantially perpendicular to the clearance face. Basically it is also possible to form the recesses as conical dome's penetrating the cutting edge with a substantially perpendicular lowest surface line with respect to the clearance face, or as ellipsoid or paraboloid domes penetrating the cutting edge with their lowest surface line being substantially perpendicular to the clearance face.

In order to achieve an especially low cutting resistance and low heat transfer from the chips to the cutting insert, it is of advantage when the distance between the cutting edge and the limiting edge of the recesses at the side of the plateau is less than 50%, preferably 20% to 30% of the distance between the cutting edge and the plateau edge at the side of the cutting edge.

The cutting insert can be provided with a plurality of cutting edges which delimit a polygon and are penetrated by dome-shaped recesses, while the possibly wave-shaped and/or zig-zag-shaped curved limiting lines of the chip forming steps may form a correspondingly contoured circumferential polygon at a distance from the cutting edges.

In order to avoid breaking of the insert, especially the inner insert of a solid drill, there is provided in accordance with an advantageous or alternative embodiment of the invention that the cutting edges are partially chamfered in the region between the recesses which are adjacent via the corners of the cutting insert. In order to allow use of the cutting inserts as inner or outer inserts of a solid drill, it is of advantage when the cutting edges are chamfered asymmetrically in the region of the corner area between the corner and only one of the adjacent recesses. For this purpose, the cutting edges can be chamfered, if necessary, also in the region between the recess adjacent a corner and the next, possibly also the following recess in continuation of the corner chamfers extending from a corner.

BRIEF DESCRIPTION OF THE DRAWINGS

The invention will now be illustrated with the help of a number of embodiments shown in the drawings, in which

FIGS. 2a, 2b, 2c, 2d, 2e, 2f, 2g, 2h, 2i show an enlarged part from FIG. 1 respectively with nine different embodiments of the chip forming steps;

FIG. 4a shows another embodiment of a trigonal cutting insert in a diagrammatical view;

FIG. 4b shows a plan view of the cutting insert according to FIG. 4a;

FIG. 4c shows a section along line C—C of FIG. 4b;

FIGS. 4d and 4e show a view in direction D and E of FIG. 4b in an enlarged sectional view; and FIG. 5 shows a trigonal cutting insert with asymmetrical chamfering in a view corresponding to FIG. 4a.

DETAILED DESCRIPTION

Figure 1:
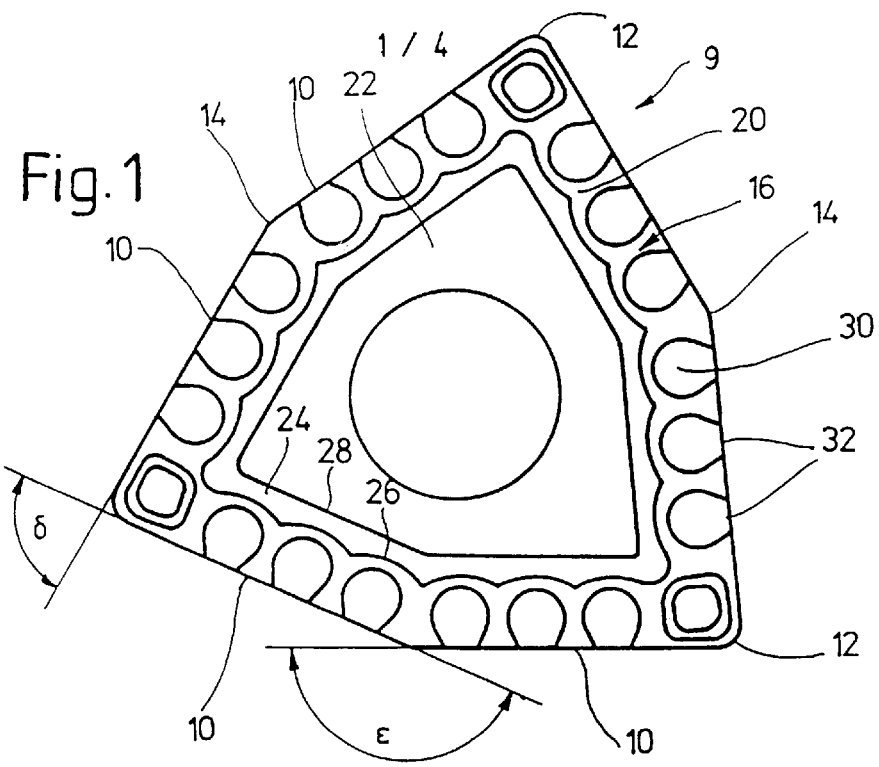
FIG. 1 shows a top view of a trigonal cutting insert.
Figure 3A:
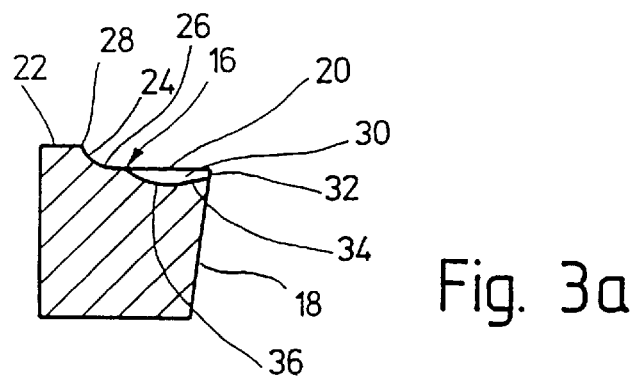
FIG. 3a shows a section along line A—A of FIG. 2e.

The cutting inserts shown in FIGS. 1 and 4a are formed in the outline of hexagonal indexable cutting insert bodies 9, the cutting edges 10 of which are connected at corners 12 and 14 alternating by an acute corner angle δ and an obtuse corner angle ε. Such cutting inserts are used, for example, in solid drills, in which two cutting edges 10 separated from each other by the obtuse corner angles are effective in pairs up to the adjacent corners 12. The cutting edges 10 are formed by the transition between the rake face 16 and the adjacent clearance face 18. The rake face 16 is divided into a substantially plane planar portion 20 close to the cutting edge, and a plateau 22, situated higher and away from the cutting edge, connected to each other in a chip travel direction by a chip forming step 24. The chip forming step 24 verges at its limiting line 26 at the side of the cutting edge tangentially into the planar portion 20, while it verges at the limiting line 28 away from the cutting edge sharp-edged into the plateau 22 (FIGS. 3a, b and 4c). In the center of the plateau region 22 there is situated an opening 23 for the passage of a fastening screw (not shown).

Figure 3B:
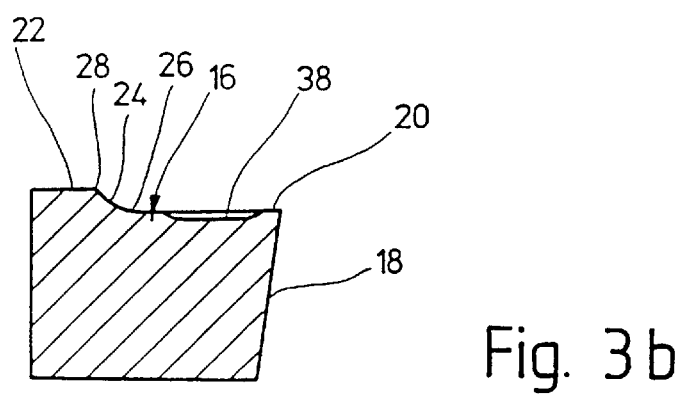
FIG. 3b shows a section along line B—B of FIG. 2e.

The planar portions 20 and the chip forming steps 24 which belong to each cutting edge are connected to each other via corners 12,14 and form a continuous coherent plane or step. Dome-shaped recesses 30, which extend up to the cutting edge 10 and penetrate this in an edge section 32, are arranged in the rake face in the region of the planar portions 20 along the cutting edge 10 next to each other and at a distance from each other. According to the embodiments of FIGS. 1 to 3, the recess 30 is formed in the region 34 adjacent the cutting edge converging towards the cutting edge conically dome-shaped, while it is spherically dome-shaped in the region 36 away from the cutting edge. In the region of the acute corners 12, there is provided in addition a through-shaped recess 38 in the planar portion 20, at a distance from each cutting edge 10 and the corner 12, the depth of which is less than that of the dome-shaped recesses 30.

The embodiments shown in FIGS. 2a to 2i differ from each other mainly in the form of the chip forming step 24. The chip forming step 24 may touch at its inner limiting line 26 either linearly parallel to the cutting edge 10 the recesses 30, 38 (FIG. 2a), or may run at a small distance therefrom (FIG. 2b). The chip forming step 24 may also be formed at its limiting line 26 at the side of the cutting edge wave-shaped and/or zig-zag-shaped, but in such a way that it either touches the dome-shaped recesses 30 (FIGS. 2c, 2d, 2g, 2h), is at a distance therefrom (FIG. 2c), or may partially extend into this (FIG. 2f and i) This results in an additional break-promoting chip deformation by wedge formation in the region of the chip forming step in the region between the recesses 30 (FIGS. 2c, 2d, 2e and 2g) on the one hand, or in the dome-shaped recesses 30 (FIGS. 21 2h and 2i) on the other hand.

The limiting line 28 of the chip forming step 24 on the side of the plateau may be either straight (FIGS. 2a, 2b, 2c, 2d, 2f) or wave-shaped (FIGS. 2g, 2h, 2i), wherein in the latter case the wave-shape is either in the same direction (FIGS. 2g, 2h) or in the opposite direction (FIG. 2i) of the line 26.

In the embodiments shown in FIGS. 4a to 4e and 5, the planar portion 20 and the chip forming step 24 adjacent thereto in the chip travel direction are formed concavely, verging gradually tangentially into each other. The cutting insert has a foot surface extending in a clamping plane 44 and a central axis 46 extending centrally through opening 23. The central axis 46 is perpendicular to the clamping plane 44. An insert plane 40 extends perpendicular to the central axis 46 downwardly spaced from the plateau 22. The rake angle α with respect to the insert plane 40 is positive at the cutting edge 10 and is approximately 15° to 20° (FIG. 4e). The recesses 30 are formed as short cylindrical domes penetrating the cutting edge 10 and having a cylinder axis which is approximately perpendicular to the clearance face 18. The cutting angle β with respect to the insert plane 40 is negative and is approximately −5° (FIG. 4e). The distance between the cutting edge 10 and the limiting edge of the recesses 30 on the side of the plateau is relatively small and comprises only about 20 to 30% of the distance between the cutting edge 10 and the plateau limiting line 28 at the side of the cutting edge.

In order to avoid breakage in the region of the insert corners 12, especially when the cutting insert is employed as an inner insert in a solid drill, the cutting edges 10 are provided in the region of the recesses 30 which are adjacent via the corner 12, with a chamfer 42 having a chamfer angle γ of about 20° with respect to the insert plane 40 (FIGS. 4a and 4d).

Figure 5:
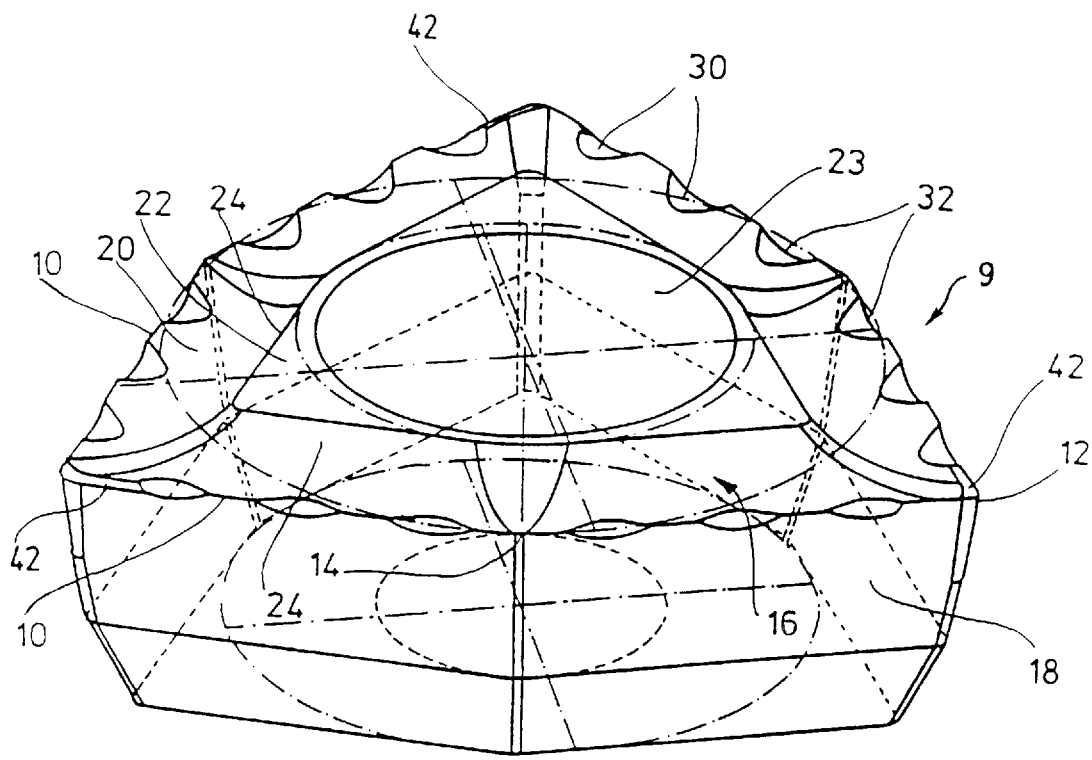

In the embodiment shown in FIG. 5 the corner chamfers 42 are disposed between the insert corner 12 and only one of the adjacent recesses 30, while the cutting edge 10 is formed in a sharp-edged manner between the corner 12 and the other recess 30. In solid drills fitted with cutting inserts which are staggered radially with respect to each other, the cutting inserts point radially to the drill center with their chamfered corner and to the outside with their sharp-edged corner. This allows the use of the same cutting inserts as inner inserts or outer inserts of a solid drill, without loss of cutting quality despite the corner chamfers.

In principle it is possible to provide also the cutting edge regions touching the recess adjacent corner 12 with a chamfer up to the next or subsequent recess 30. This chamfer should, however, not be continued beyond each adjacent blunt cutting edge corner 14.

In summary, the following can be stated: The invention relates to a cutting insert for chip forming machining of preferably metallic workpieces. The cutting insert has at least one cutting edge 10 in the transition region between a rake face 16 and a clearance face 18, wherein the rake face 16 has a plane rake face section 20 extending essentially parallel with respect to the cutting edge 10 and a plurality of dome-shaped recesses which are spaced with respect to each other and parallel to the cutting edge 10, which are moulded into the rake face section 20, and which partially penetrate the cutting edge 10. In order to facilitate an undisturbed stress relief while forming short broken chips, it is proposed according to the invention to provide a chip forming step 24 on the side of the dome-shaped recesses which is opposite the cutting edge 10, which step projects beyond the rake face section, and which is delimited by a lower limiting line 26 on the side of the cutting edge and by an upper limiting line 28 away from the side of the cutting edge, which limiting lines 26, 28 may be straight or wave-shaped.

I claim:

1. A cutting insert for chip forming machining of metallic work pieces, comprising a body having a foot surface, an axis perpendicular to the foot surface, at least one cutting edge limited by a rake face and a clearance face, a cutting insert plane expanding outwardly through the clearance face and extending perpendicularly to the axis, the rake face having a rake face section adjoining the cutting edge, the rake face section having a positive rake angle relative to the cutting insert plane and having a plurality of dome-shaped recesses arranged parallel to the cutting edge at a distance from each other, the recesses being moulded into the rake face section and limited by an upper edge with respect to the rake face section, the recesses partially penetrating the cutting edge, and a chip forming step in the rake face on a side of the recesses remote from the cutting edge, the chip forming step projecting axially beyond the rake face section, the step being limited by a lower limiting line adjacent the cutting edge and an upper limiting line remote from the cutting edge, the rake face at the dome-shaped recesses extending at a neutral or negative rake angle with respect to the cutting insert plane, the recesses being formed as one of a conical, cylindrical, ellipsoid and parabolic domes penetrating the cutting edge, the recesses having a lowest surface line substantially perpendicular to the clearance face.

2. The cutting insert according to claim 1, wherein the rake face section is bent concavely between the cutting edge and the chip forming step, and the chip forming step verges in a sharp-edged manner into a central rake face plateau at the upper limiting line remote from the cutting edge, the chip forming step being bent concavely between the rake face section and the rake face plateau and being joined to the rake face section tangentially, and the rake face plateau being disposed above the cutting edge.

3. The cutting insert according to claim 1, wherein several cutting edges delimit a polygon having corners, each cutting edge is penetrated by the dome-shaped recesses, and the cutting edges are partially chamfered in a region between the recesses at the corners of the cutting insert polygon.

4. The cutting insert according to claim 3, wherein the cutting edges are chamfered asymmetrically in a corner area between one of the corners and only one adjacent recess.

5. The cutting insert according to claim 1, wherein the lower and upper limiting lines of the chip forming step extend linearly or wave shaped, substantially parallel to the cutting edge, and the lower limiting line either touches the recesses or is arranged at a distance from the recesses.

6. The cutting insert according to claim 5, wherein several cutting edges delimit a polygon and are penetrated by a dome-shaped recesses, and the lower and upper limiting lines of the chip forming steps form at a distance from the cutting edges a similarly contoured polygon.

7. The cutting insert according to claim 1, wherein the body has a central plateau that ends in a plateau edge, and a distance between the cutting edge and the limiting upper edge of the recesses at the side of the plateau is less than 50% of the distance between the cutting edge and the plateau edge at the side of the cutting edge.

8. The cutting insert according to claim 1, wherein the rake angle in the region of the dome-shaped recesses is 0° to −10° at the cutting edge.

9. The cutting insert according to claim 1, wherein the rake angle is positive at the cutting edge and is 10° to 25°.

10. The cutting insert according to claim 1, wherein the lower limiting line at the side of the cutting edge runs in one of a wave and zig-zag-shape and has a wavelength corresponding to a distance between respective centers of the recesses.

11. The cutting insert according to claim 10, wherein the chip forming step at the lower limiting line extends wedge-shaped into the regions between the recesses and defines wedge tips which point to the cutting edge.

12. The cutting insert according to claim 10, wherein the chip forming step at the lower limiting line extends wedge-shaped into the recesses and defines respective wedge tips thereat, which point to the cutting edge, and forms there the upper edge of the recess.

13. The cutting insert according to claim 10, wherein the chip forming step at the upper limiting line extends away from the cutting edge in one of a wave-shape and a zig-zag-shape substantially in phase parallel to the lower limiting line.

14. The cutting insert according to claim 3, wherein the cutting edges are chamfered asymmetrically from each corner past one of the recesses adjacent each corner.

15. The cutting insert according to claim 14, wherein the cutting edges are chamfered past two of the recesses adjacent each corner.

16. The cutting insert according to claim 13, wherein the chip forming step at the upper limiting line extends away from the cutting edge in a one of a wave-shape and zig-zag-shape substantially out of phase to the lower limiting line.

17. The cutting insert according to claim 1, wherein an opening extends coaxially to the axis through the body.

* * * * *